US006526213B1

(12) United States Patent
Ilenda et al.

(10) Patent No.: US 6,526,213 B1
(45) Date of Patent: Feb. 25, 2003

(54) LIGHT PIPE COMPOSITION

(75) Inventors: Casmir Stanislaus Ilenda, Holland, PA (US); Brian Francis Leonard, Philadelphia, PA (US); Michael Thomas Caro, Philadelphia, PA (US)

(73) Assignee: Fiberstars Incorporated, Solon, OH (US)

( * ) Notice: Subject to any disclaimer, the term of this patent is extended or adjusted under 35 U.S.C. 154(b) by 0 days.

(21) Appl. No.: 09/313,594

(22) Filed: May 18, 1999

Related U.S. Application Data

(60) Provisional application No. 60/086,462, filed on May 22, 1998.

(51) Int. Cl.$^7$ ................................................. G02B 6/16
(52) U.S. Cl. ....................... 385/143; 385/123; 385/901; 252/301.16
(58) Field of Search ................................. 385/143, 901, 385/123, 127, 126, 125, 124, 141, 145

(56) References Cited

U.S. PATENT DOCUMENTS

| | | | |
|---|---|---|---|
| 3,793,402 A | 2/1974 | Owens | |
| 3,971,835 A | 7/1976 | Myers et al. | |
| 4,034,013 A | 7/1977 | Lane | |
| 4,182,885 A | * 1/1980 | Bunes et al. | ................... 546/76 |
| RE31,868 E | 4/1985 | Beasley et al. | |
| 4,541,693 A | 9/1985 | Knoll et al. | |
| 4,707,513 A | 11/1987 | Baer | |
| 4,713,268 A | 12/1987 | Carson | |
| 4,743,642 A | 5/1988 | Yanacek et al. | |
| 5,102,625 A | * 4/1992 | Milo | ....................... 422/82.07 |
| 5,116,547 A | 5/1992 | Tsukahara et al. | |
| 5,229,208 A | 7/1993 | Tanaka et al. | |
| 5,321,056 A | 6/1994 | Carson et al. | |
| 5,322,663 A | 6/1994 | Lai et al. | |
| 5,343,460 A | * 8/1994 | Miyazaki et al. | ........... 369/126 |
| 5,438,099 A | 8/1995 | Fischer et al. | |
| 5,460,911 A | * 10/1995 | Yu et al. | ....................... 430/64 |
| 5,485,541 A | 1/1996 | Bigley, Jr. et al. | |
| 5,534,594 A | 7/1996 | Troy et al. | |
| 5,540,862 A | * 7/1996 | Cao et al. | ................... 252/500 |
| 5,560,994 A | 10/1996 | Kitaike et al. | |
| 5,563,227 A | 10/1996 | Kitaike et al. | |
| 5,576,394 A | 11/1996 | Chao et al. | |
| 5,579,429 A | * 11/1996 | Naum | ........................ 385/143 |
| 5,599,854 A | 2/1997 | Troy et al. | |
| 5,616,638 A | 4/1997 | Hallden-Abberton et al. | |
| 5,652,306 A | 7/1997 | Meyer et al. | |
| 5,668,215 A | 9/1997 | Chao et al. | |
| 5,681,803 A | * 10/1997 | Okano et al. | ................ 510/130 |
| 5,692,088 A | 11/1997 | Ishiharada et al. | |
| 5,804,609 A | * 9/1998 | Ohnishi et al. | ................. 522/74 |
| 5,874,154 A | * 2/1999 | Bickford et al. | ............ 428/131 |
| 5,879,894 A | * 3/1999 | Law et al. | .................... 435/7.1 |
| 5,916,648 A | 6/1999 | Daecher | |
| 5,930,442 A | 7/1999 | Abramowicz et al. | |
| 5,994,498 A | * 11/1999 | Tripathy et al. | ............. 528/422 |
| 6,229,252 B1 | * 5/2001 | Teng et al. | .................. 313/112 |
| 6,306,598 B1 | * 10/2001 | Charych et al. | ................ 435/6 |

FOREIGN PATENT DOCUMENTS

| | | |
|---|---|---|
| EP | 190830 A | 8/1986 |
| EP | 597 275 B1 | 10/1993 |
| EP | 629656 A2 | 12/1994 |
| JP | 54-48850 | 4/1979 |
| JP | 03 263004 | 11/1991 |
| JP | 07 082376 | 3/1995 |
| JP | 10 288713 | 10/1998 |
| WO | 93/21274 | 10/1993 |

OTHER PUBLICATIONS

European Patent Office search report for application 09/313, 594, counterpart of the instant application, 2 pages.
Takezawa, et al., Journal of Applied Polymer Physics, vol. 42, pp. 2811–1817, 1991.

* cited by examiner

*Primary Examiner*—Frank G. Font
*Assistant Examiner*—Michael P. Mooney
(74) *Attorney, Agent, or Firm*—Charles E. Bruzga

(57) ABSTRACT

The present invention provides polymeric material compositions having excellent white light transmission that is substantially free of color over long light path lengths. This invention also provides polymeric material compositions that provide for the transmission of light having a controlled color when illuminated with a white light source.

8 Claims, No Drawings

LIGHT PIPE COMPOSITION

This is a nonprovisional application of prior pending provisional application Serial No. 60/086,462 filed May 22, 1998.

This invention relates to polymeric compositions having excellent white light transmission that is substantially free of color over long light path lengths. Specifically, the invention relates to polymeric light pipe compositions having trace amounts of dyes that counteract the inherent absorption of red light to provide for the transmission of substantially colorless light when illuminated with a white light source. Furthermore, the invention also relates to light pipe compositions having trace amounts of dyes to provide for the transmission of light having a controlled color when illuminated with a white light source. The invention also relates to light pipe compositions having trace amounts of dyes that reduce the color of light when illuminated with an off-white light source.

Polymeric materials having excellent light-transmitting properties are known in the art. Such polymeric material is generally prepared using high glass transition temperature ("Tg") clear plastics such as polystyrene, polycarbonate, polymethyl methacrylate, polymethyl glutarimide, etc., and rubbery polymers such as crosslinked polyethylacrylate, polydimethylsiloxane, etc.

Applications requiring low color polymeric materials having excellent light-transmitting properties include light pipes for remote-source lighting systems, large plastic sheeting in which the edge color is minimized or controlled, plastic viewing windows or tanks for aquariums, and plastic block for windows.

One example of light transmitting polymeric materials are polymeric light pipes. Polymeric light pipes having excellent light-transmitting properties generally include a core material with a cladding material covering the core. Light pipes have been prepared using polymeric materials in the pipe core that have a low light absorption and low refractive index polymers for the pipe cladding.

One problem which exists for polymeric light pipes is that the length of the light pipe useful for transmission is limited. This is in contrast to inorganic glass optical fibers which have light transmission characteristics useful in fiber optic communication networks wherein digital light signals are transmitted over distances of tens of kilometers without significant attenuation. Polymers, on the other hand, have much higher absorption of light than do inorganic glasses, thus polymeric materials are limited to applications requiring transmission of light up to distances of tens of meters.

It is known that transparent polymeric materials have a light absorbance at peak maximum at a wavelength between 600 and 650 nm which arises from the vibrational overtones and harmonics of the carbon-hydrogen bonds. The wavelengths and assignments of the absorbance maxima of polymethyl methacrylate are 740 nm ($v_5$), 680 nm ($v_5+\delta$), 630 nm ($v_6$), and 550 nm ($v_7$). (Takezawa, et al., Journal of Applied Polymer Physics, vol. 42, pp. 2811–2817, 1991). The absorbance at 630 nm ($v_6$), referred to in the art as the sixth harmonic of the carbon-hydrogen stretch causes white light passing through a meter or more of polymethyl methacrylate to appear green.

It is also known that the significant absorbances in polystyrene arising from carbon-hydrogen bond harmonics and overtones also occur at wavelengths between 600 nm and 650 nm. Thus, it is expected that all polymeric materials having carbon-hydrogen bonds will have an absorbance in the vicinity of 630 nm. Hence, it is expected that all low color polymeric materials having excellent light-transmitting properties and having carbon-hydrogen bonds will cause white light passing through a meter or more of the polymeric material to appear green. Although this is only a very slight color shift, this problem is particularly apparent in applications, such as light pipes for remote source lighting systems, wherein polymeric materials are required to transmit white light through a meter or more of the polymeric material.

Although glass has superior light transmission properties, rubbery polymeric fibers are much more flexible, workable, and lower in weight than glass optical fibers. These characteristics, together with their light transmission limitation of tens of meters, make polymeric light pipes useful for applications such as signs, instrumentation displays, medical devices, etc. Rubbery polymeric materials are especially useful for preparing large-core diameter (greater than about three millimeters) light pipes that are particularly useful in remote-source lighting applications where the large diameter allows the transmission of a large quantity of light from a single light source (illuminator) to multiple points up to tens of meters away.

Accordingly, it is desirable to provide relatively long, highly transparent, polymeric light pipes wherein no such color change occurs as the light path through the polymeric material is lengthened. These light pipes could provide light with a color that is independent of length. In end light applications, light pipes of different lengths can be used since all lengths will provide illumination of the same color. In side light applications, the color of the light will not change along the length.

In certain applications, such as remote source lighting, it is also desirable to provide relatively long, highly transparent, polymeric light pipes in which the color is controlled. Colored light is useful for lighting merchandise in display cases whereby the merchandise appears to be more appealing with light having a slight hue rather than pure white light. For example, light having a bluish hue is useful for illuminating yellowish articles, such as jewelry and the like, to make these articles appear desirably whiter. On the other end of the spectrum, light having a reddish hue provides a "warmer" appearance to furniture and household goods. Also, some light sources produce light that is off white or yellow. In these cases it is sometimes desirable to reduce the color of the light, or make the transmitted light whiter.

One attempt to overcome the problems associated with the absorbance of light arising from the carbon-hydrogen bonds of the polymeric cores in optical fibers is disclosed in U.S. Pat. No. RE 31,868 to Beasley, et al. Beasley discloses several polymeric materials that have substantially diminished absorption arising from carbon-hydrogen covalent bonds, which as a result, have remarkably high transmission of light in the visible spectrum. The suitable polymeric materials include acrylates and methacrylates containing deuterium wherein the carbon-hydrogen covalent bonds have been replaced by carbon-deuterium covalent bonds. Optical fiber cores disclosed by Beasley are copolymers that contain a percentage of deuterium containing methyl methacrylate or deuterium containing polymethyl methacrylate polymer itself. As a result, polymers disclosed by Beasley are not expected to cause white light to turn green over relatively long distances compared to light pipe cores having hydrogen containing polymethyl methacrylate. Unfortunately, compared to commercially-available hydrogen containing monomers, deuterium containing monomers are only available in small research quantities, thereby making large-core optical fibers having deuterium containing polymers impracticable and prohibitively expensive for applications such as remote source lighting.

One attempt to overcome the problem of providing colored light emanating from polymeric light pipes is disclosed in U.S. Pat. No. 5,579,429 to Naum. Naum discloses a large core optical fiber with a fluorescent dye that provides a monochromatic neon-like side emission. The core is a methyl methacrylate polymer crosslinked by polymerization in the presence of allyl diglycol carbonate and a laser dye that fluoresces to produce light of a narrow wavelength (i.e., a single pure color) out the side of the optical fiber. Selection of the dye results in side light emission of the desired color ranging from blue-violet to red. The dye compositions of Naum are useful for light pipes that transmit intense monochromatic light using high concentrations of laser dyes. This approach is not suitable for providing light pipes that transmit light having substantially no color. The present invention seeks to overcome the problems of this prior art.

The present inventors have now discovered practicable polymeric light pipe compositions that counteract the carbon-hydrogen absorbance at 630 nm so that the color of the light emanating from such light pipes does not change substantially as the length of the light pipe is increased. Furthermore, the present inventors have now discovered practicable polymeric light pipe compositions that provide controlled color to the light emanating from such light pipes. This is accomplished by adding trace amounts of dyes, having particular absorbances, to polymeric light pipe core compositions to effectively counteract the carbon-hydrogen absorption at 630 nm to provide for the transmission of substantially colorless light for various lengths of light pipe when illuminated with a white light source. Additionally, it has been discovered that trace amounts of dyes having particular absorbances when added to polymeric light pipe core compositions can effectively control the color of transmitted light when illuminated with a white light source.

In a first aspect of the present invention, there is provided a composition including:

(a) one or more polymeric materials having a first light absorbance at peak maximum; and (b) one or more dyes having a second light absorbance at peak maximum and which does not reemit light visible to the naked human eye, wherein the first and second light absorbance at peak maximums are chosen to control the color of the light passing therethrough.

In a second aspect of the present invention, there is provided a light pipe having a core including (a) one or more polymeric materials having a first light absorbance at peak maximum; and (b) one or more dyes having a second light absorbance at peak maximum and which does not reemit light visible to the naked human eye, wherein the first and second light absorbance at peak maximums are chosen to control the color of the light passing therethrough.

Terms used to describe the present invention are as follows:

The term "polymeric" is understood to include within its scope all types of molecules characterized as having repeating units of atoms or molecules linked to each other such as oligomers, homopolymers, co-polymers including block, random and alternating co-polymers, grafted polymers and co-polymers, terpolymers, etc.

The term "ANSI" is understood to mean the organization called the American National Standards Institute.

The term "amu" is understood to mean "atomic mass units" which is also understood to have substantially the same numeric value as molecular weight expressed in grams per mole, or "g/mol".

The term "b.o.m." is understood to mean "based on monomer weight".

The composition of the present invention preferably includes one or more polymeric materials having a first light absorbance at peak maximum and one or more dyes having a second light absorbance at peak maximum, wherein the first and second light absorbance at peak maximums are chosen to control the color of the light passing therethrough. The light absorbance at peak maximums may also neutralize each other so that the composition does not substantially change the color of white light passing therethrough.

Generally, polymeric materials in the composition are, preferably, of the acrylic, methacrylic, styrenic, polycarbonate, silicone, or polyglutarimide families of substantially colorless ("transparent") polymers. The polymeric materials include, more preferably, transparent plastics such as polystyrene, polycarbonate, polymethyl methacrylate, polymethyl glutarimide, and other copolymers and terpolymers of styrenes, dienes, C1–C8 n-alkylacrylates, and C1–C8 n-alkylmethacrylates. The polymeric materials which are most preferable include transparent rubbery polymers such as crosslinked polyethylacrylate and polydimethylsiloxane, and other rubbery copolymers and terpolymers of styrenes, dienes, C1–C8 n-alkylacrylates, and C1–C8 n-alyklmethacrylates which provide for compositions of the present invention having excellent flexibility.

The one or more polymeric materials according to the present invention preferably have a light absorbance at peak maximum at wavelengths between 600 and 650 nm arising from carbon-hydrogen bonds contained in the polymeric material. It is known that polydimethylsiloxane contains 81 carbon-hydrogen bonds per 1,000 amu, polyethylacrylate contains 80 carbon-hydrogen bonds per 1,000 amu, polymethyl methacrylate contains 80 carbon-hydrogen bonds per 1,000 amu, polystyrene contains 77 carbon-hydrogen bonds per 1,000 amu, and polycarbonate contains 55 carbon-hydrogen bonds per 1,000 amu. Therefore the polymeric materials have preferably greater than zero, more preferably greater than 10, and most preferably greater than 30 carbon-hydrogen bonds per 1000 atomic mass units.

Dyes are those that the United States Federal Trade Commission has classified as solvent dyes and disperse dyes. Many dyes are also classified in the Color Index by the Society of Dyers and Colourists with a C. I. Number. Dyes are known to belong to a family of dyes classified by their C. I. designation. Examples of dyes and dye families are: azo dyes (Solvent Yellow 14, Solvent Red 24, Disperse Yellow 23), quinoline dyes (Solvent Yellow 33), perinone dyes (Solvent Orange 60, Solvent Red 135, Solvent Red 179), anthraquinone dyes (Solvent Red 52, Solvent Red 111, Disperse Violet 1, Disperse Violet 26, Solvent Violet 36, Solvent Violet 13, Solvent Violet 14, Solvent Blue 56, Solvent Blue 97, Solvent Green 3, Solvent Green 28), xanthene dyes (Solvent Green 4, Solvent Orange 63), azine dyes (induline, nigrosines), methine dyes (Disperse Yellow 201), thioindigo dyes, phthalocyanine dyes, and perylene dyes.

In a preferred embodiment, when the absorbance at peak maximum of the one or more polymeric materials is at wavelengths between 600 and 650 nm, then the wavelength of the absorbance at peak maximum of the one or more dyes is between 500 and 580 nm, preferably between 520 and 570 nm, and more preferably between 535 and 560 nm in order for the one or more dyes to neutralize the green light transmitted through the one or more polymeric materials. It is known that dyes having absorbances at peak maximums at wavelengths between 500 and 580 nm range in color from orange to red to violet. Therefore the one or more dyes preferably range in color from orange to red to violet. The one or more dyes also are preferably soluble in the one or more polymeric materials.

It is also known that polymeric materials degrade compositionally in the presence of heat, oxygen, and/or visible and ultraviolet light. Such degradation causes increased absorbance of light at wavelengths less than 570 nm, causing the polymeric material to yellow. In this case, it is known that dyes having absorbances at wavelengths greater than 570 nm are useful to neutralize the absorbances at wavelengths less than 570 nm to make the light passing through the material appear less yellow. It is also known that some light sources, such as fluorescent lights, provide off-white light that appears yellow which is undesirable. It is therefore preferable that when a yellow appearance is undesirable, the one or more dyes has an absorption at peak maximum at wavelengths greater than 570 nm. Many dyes that have an absorption at peak maximum at wavelengths greater than 570 nm have a blue color.

Dyes that resist fading in the presence of visible and ultraviolet light belong to the anthraquinone, perinone, and xanthene families of dyes. Because applications and lighting systems of the present invention involve transmitting high intensity visible light, and possibly some ultraviolet light, through long path lengths of compositions of the present invention, it is preferred that the one or more dyes belong to the anthraquinone, perinone, and xanthene families of dyes. Specific examples of dyes in the anthraquinone family are listed in Table 1.

of the light absorbance at peak maximum of the one or more polymeric materials. This percentage is referred to as the "percent ratio of the absorbances at peak maximums", or simply "f".

The amount of dye in the composition of the present invention required to produce a particular value of f is preferably calculated according to the following equation:

$$C_{dye} = 0.001 \times f \times \alpha^* \times \epsilon^{-1} \quad \text{[Equation 1]}$$

wherein $C_{dye}$ is the concentration of dye in the composition expressed in units of moles dye per liter composition ("mol/l"); f is the percent ratio of the absorbances at peak maximums, $\alpha^*$ is the corrected absorbance at the maximum of the peak for the polymeric material expressed in units of decibels per meter ("dB/m"), and $\epsilon$ is the molar absorptivity of the dye at the absorbance at peak maximum between 500 and 580 nm expressed in units liters per mole-centimeter ("l/mol·cm"), and 0.001 is a proportionality constant.

The corrected absorbance at the maximum of the peak for the polymeric material, $\alpha^*$, is determined from the visible absorption spectrum of the polymeric material is measured using a halogen light source and detecting the light absorbance versus wavelength spectrum using a photodiode array spectrograph. The magnitude of the absorbance at the maximum of the peak ("$\alpha_{max}$") at wavelengths between 600 and 650 nm is recorded in units of decibels per meter ("dB/m"). The baseline absorbance ("$\alpha_{base}$") of the spectrum in the vicinity of $\alpha_{max}$ is subtracted therefrom to provide the corrected absorbance at the maximum of the peak ("$\alpha^*$"). For example, in one embodiment of the present invention, $\alpha_{max}$ for crosslinked polyacrylate occurs at 630 nm and has a magnitude of 0.59 dB/m, $\alpha_{base}$ is represented by the absorbance at 600 nm which has a magnitude of 0.17 dB/m, therefore the magnitude of $\alpha^*$ is 0.42 dB/m.

TABLE 1

Dyes in the Anthraquinone Family

| | | | |
|---|---|---|---|
| CAS # | 8005-40-1 | 81-39-0 | 82-38-2 |
| C.I. Index Number | C.I. 61705 | C.I. 68210 | C.I. 60505 |
| CA Index Name | 9,10-Anthracenedione, 1,5(or 1,8)-bis[(4-methylphenyl)amino] | 3H-Dibenz[f,ij]isoquinoline-2,7-dione, 3-methyl-6-[(4-methylphenyl)amino]- | 9,10-Anthracenedione, 1-(methylamino)- |
| Alternate Name | Fat Soluble Anthraquinone Violet | 3-methyl-6-p-toluidino-3H-dibenz[f,ij]isoquinoline-2,7-dione | Anthraquinone, 1-(methylamino)- |
| C.I. Name | C.I. Solvent Violet 14 | C.I. Solvent Red 52 | C.I. Solvent Red 111, C.I. Disperse Red 9 |
| Molecular Weight | 418.5 g/mol | 366.4 g/mol | 237.3 g/mol |
| Concentration† | 0.0842 mM | 0.101 mM | 0.183 mM |
| Absorbance at† | 1.33 dB/m | 1.101 dB/m | 1.204 dB/m |
| Peak Maximum and Wavelength | 555 nm | 540 nm | 500 nm |
| Molar Absorptivity†, $\epsilon$ | 15,800 l/mol · cm | 10,900 l/mol · cm | 6,600 l/mol · cm |

†Dye solutions prepared in ethyl acetate.

It is also known that a combination of dyes can also be used to produce a particular color shift. For example, a dye with a color corresponding to the color of the desired light output can be used in combination with an amount of red dye sufficient to neutralize the green color.

The concentration of the one or more dyes should be sufficient to provide a light absorbance at peak maximum that is preferably from 0.2% to 2000%, more preferably from 1% to 1000%, and most preferably from 5% to 100%

The molar absorptivity of a dye at the absorbance at peak maximum between 500 and 580 nm, $\epsilon$, is expressed in units of l/mol-cm and determined from dilute solution measurements using a suitable UV-VIS spectrophotometer. Beer's Law provides that $$A_{sol} = \epsilon \times C_{sol} \times L \quad \text{[Equation 2]}$$

wherein $A_{sol}$ is the absorbance at peak maximum at wavelengths between 500 and 580 nm of the dye solution, $C_{sol}$ is the concentration of the dye in dilute solution expressed in units of mol/l, and L is the path length of the sample cell expressed in units of centimeters.

For example, in one embodiment of the present invention, a $0.0842 \times 10^{-3}$ mol/l solution of C. I. Solvent Violet 14 is prepared in ethyl acetate solvent and measured in a 1 cm path quartz sample cell using a Perkin Elmer Lambda 6 Spectrophotometer to provide a value of $A_{sol}$ of 1.33 dB/m at 555 nm, which provides a molar absorptivity of 15,800 l/mol-cm according to Equation 2.

According to Equation 1, a composition according to the present invention wherein the polymeric material is polyethylacrylate and the dye is C. I. Solvent Violet 14, the concentration of the dye required to provide f=50% in the composition is:

$$C_{dye} = 0.001 \times 50\% \times 0.42 \times 15{,}800^{-1}$$

source. The expression $(\Delta x^2 + \Delta y^2)^{1/2}$ defines the color difference ("$\Delta_{x,y}$") wherein $\Delta x$ is the difference in x-coordinate between the light source and the light exiting the light pipe (x-coordinate of light exiting light pipe minus the light source x-coordinate) and $\Delta y$ is the difference in y-coordinate between the light source and the light exiting the light pipe (y-coordinate of light exiting light pipe minus light source y-coordinate). The best approximation for the optimum dye concentration occurs when the magnitude of $\Delta_{x,y}$ is minimized. The values of $\Delta_{x,y}$ calculated for compositions having a crosslinked polyethylacrylate ("PEA") polymeric material and various concentrations of several anthraquinone dyes are listed in Table 2 using two different white light sources having different power spectrums. The color difference results in Table 2 predicts that the optimum dye concentration of each dye in PEA is between 2 and 6 ppb.

TABLE 2

Calculated Color Differences in Dyed PEA

| C.I. Solvent Violet 14 | | | | C.I. Solvent Red 52 | | | | C.I. Solvent Red 111 | | | |
|---|---|---|---|---|---|---|---|---|---|---|---|
| GE-ARC-1 metal halide | | QTH halogen | | GE-ARC-1 metal halide | | QTH halogen | | GE-ARC-1 metal halide | | QTH halogen | |
| $\Delta_{x,y}$ | C, ppb | $\Delta_{x,y}$ | C, ppb | $\Delta_{x,y}$ | C, ppb | $\Delta_{x,y}$ | C, ppb | $\Delta_{x,y}$ | C, ppb | $\Delta_{x,y}$ | C, ppb |
| 0.00275 | 0.00 | 0.00360 | 0.00 | 0.00275 | 0.00 | 0.00360 | 0.00 | 0.00275 | 0.00 | 0.00361 | 0.00 |
| 0.00167 | 1.56 | 0.00251 | 1.56 | 0.00176 | 1.65 | 0.00256 | 1.65 | 0.00254 | 1.94 | 0.00251 | 3.89 |
| 0.00062 | 3.12 | 0.00156 | 3.12 | 0.00094 | 3.30 | 0.00151 | 3.30 | 0.00268 | 3.89 | 0.00246 | 4.28 |
| 0.00027 | 3.74 | 0.00120 | 3.74 | 0.00080 | 3.96 | 0.00047 | 4.95 | 0.00312 | 5.83 | 0.00243 | 4.67 |
| 0.00025 | 4.05 | 0.00092 | 4.36 | 0.00080 | 4.29 | 0.00028 | 5.28 | 0.00531 | 11.7 | 0.00241 | 5.05 |
| 0.00037 | 4.36 | 0.00083 | 4.67 | 0.00088 | 4.62 | 0.00015 | 5.61 | | | 0.00242 | 5.83 |
| 0.00056 | 4.67 | 0.00079 | 4.99 | 0.00099 | 4.95 | 0.00023 | 5.94 | | | 0.00248 | 6.61 |
| 0.00076 | 4.99 | 0.00087 | 5.61 | 0.00112 | 5.29 | 0.00061 | 6.60 | | | 0.00269 | 7.78 |
| 0.00097 | 5.30 | 0.00206 | 7.79 | 0.00127 | 5.62 | 0.00268 | 9.90 | | | 0.00559 | 15.7 |
| 0.00118 | 5.61 | 0.00309 | 9.35 | 0.00182 | 6.61 | | | | | | |
| 0.00161 | 6.23 | | | | | | | | | | |
| 0.00268 | 7.79 | | | | | | | | | | | therefore $$C_{dye} = 1.33 \times 10^{-8} \text{ mol/l}$$

which, is about 5 parts per billion ("ppb") when $C_{dye}$ is multiplied by the dye molecular weight (418.5 g/mol) and divided by the composition density (1120 g/l).

The amount of dye in the composition of the present invention required to produce a particular absorbance ratio is more preferably determined according to the following method:

The spectral power distributions of a quartz tungsten halogen light source (ANSI standard projection lamp designation EKZ) is measured using a photodiode array spectrograph and the CIE (1931) x,y chromaticity coordinates are determined as described in CIE Technical Report 15.2 (2nd ed, 1986). The x, y chromaticity coordinates are similarly determined for compositions according to the present invention which vary in dye concentration. This is repeated for several different dye concentrations in a trial-and-error fashion to establish a relationship between the dye concentration and the x, y chromaticity coordinates. The optimum dye concentration is obtained when the x, y chromaticity coordinates of the dyed composition best approximates the x, y chromaticity coordinates of the light Polymeric materials according to the present invention may be any of those taught in the art, such as in U.S. Pat. No. 5,485,541, for light pipe or optical fiber uses, such as a polyalkyl acrylate, polymethyl methacrylate, a polyglutarimide, a silicone polymer, and the like. Suitable polymeric materials may also contain large core polymethyl methacrylate which further contains plasticizers and/or crosslinkers. Suitable polymeric materials may also be multistrand high Tg fibers, such as polymethyl methacrylate. The one or more polymeric materials are transparent, preferably flexible, and preferably processable in melt form, then later cured or crosslinked to form the final core.

High light transmission light pipe requires a cladding having a refractive index lower than that of the polymeric core. Further, the cladding needs to be deposed on the polymeric core and be able to contain the core polymer effectively. Depending on the manufacturing process, the cladding may contain the monomers which are polymerized to form the core, the core polymer only partially polymerized, the core polymer polymerized but not crosslinked, and/or the fully crosslinked core polymer. Many cladding materials are known for this purpose, especially fluoropolymers which have lower refractive indices than most of the core polymers known to the art. Preferred compositions are wherein the fluoropolymer cladding is a terpolymer of perfluoroalkyl vinyl ether/tetrafluoroethylene/hexafluoro-propylene or a terpolymer of vinylidene fluoride/tetrafluoroethylene/hexafluoropropylene.

U.S. Pat. No. 5,485,541 also teaches many polymers other than fluoropolymers suitable for cladding of flexible light pipe or fibers. It is generally preferred for the present invention that the cladding be of lower refractive index than the core, that the cladding and the core bond at the surface in a uniform manner. It is further preferred that the cladding be readily co-extrudable with a co-extruded crosslinkable core.

Light pipes are often coupled to high-flux illuminators for conveying bright light to a desired use point (end-lit applications) or illumination or decoration utilizing the length of the light pipe (side-lit, side-emission applications). Preferred illuminators incorporate a GE Arcstream metal halide high intensity discharge lamp (or equivalent), or a quartz-tungsten-halogen ("QTH" or "halogen") lamp, all with proper protective spectral filtering. Other useful sources include, but are not limited to, direct solar light, focused solar light, fluorescent lamps, high-, medium- and low-pressure sodium lamps, and incandescent lamps.

There are many envisioned uses of lighting systems having one or more illuminators and one or more light pipes. Lighting systems can provide for a combination of "end-light" illumination and "side-light" illumination. In end-light applications, light is conducted from the illumination source through the light pipe and out through the other end of the light pipe to illuminate a target. Some specific uses for end-light lighting systems include: automotive and transportation uses, such as in headlights, rear appliques, interior lighting, dashboard lights, accent lights, map readers, interior and exterior lighting of boats, trailers, campers and airplanes, and the like; retail lighting uses, such as in track lighting, display cases, point of purchase displays, and the like; emergency lighting, such as in path of egress, exit signs, pathway indicators, and the like; to indoor and outdoor commercial lighting, such as in down lights, recessed solar collectors, ground level lighting, walkway lighting, airport runway lights, architectural lighting, traffic lights, mining lights, such as hard hat lighting and mine shaft lighting; to remote source systems, such as in prison cells, hazardous environments, zoos, aquariums, art museums, and the like; residential lighting, as in novel lighting for showers, vanities; specific task lighting, such as auto mechanic lighting, surgeon/dentist lighting, "high tech" manufacturing lighting, endoscopes, photographic uses, and the like; signs, such as in neo-neon, edge lit signs with plastics such as Plexiglas™ acrylic resins, video/electronic displays, highway signs, and the like; and, other specialty lighting, such as in toys, underwater lighting, in water fountains, pools, aquariums, bath tubs, hot tubs, deep sea diving, biological research-catalyzing culture growth, plant growth, and the like.

In side-light applications, light is conducted from one or more illumination source through the light pipe and out through the other end of the light pipe to illuminate a target. Some specific uses for side-light optical pipe include: certain automotive and transportation uses, such as in certain interior decorative lighting of boats, trailers, campers and airplanes, and the like; certain retail lighting uses, such as in signs for replacement or enhancement of neon lighting systems, where the evenness of lighting from such system is desirable, as for back-lighting of signs; for safety guidance lines in dark areas, or for under-counter and cove lighting; to remote source systems, such as in hazardous environments, zoos, aquariums, art museums; for personal safety, such as in hiking, biking, in-line skating, scuba diving, and the like; for task lighting; for entertainment and display uses, especially where the ability to change color rapidly and continuously is important, such as in amusement parks, fountains, etc.; and for architectural uses, such as alcoves, atriums, staircases, and the like.

The following Examples are intended to illustrate various embodiments of the present invention.

EXAMPLES

A standard laboratory process was employed as the control, following the method of Example 1 (tube filling) and Example 29 (compositional details) of U.S. Pat. No. 5,485,541. The monomer composition was 95% EA (purified through acidic alumina) and 5% distilled MATS (3-methacryloxypropyl-trimethoxysilane). Vazo 52, (DuPont) 2,2'-azobis(2,4-dimethyl valeronitrile) initiator was used at a level of 0.0416% of the monomer. Catalyst (dibutyltin diacetate at 16 ppm b.o.m.), and stabilizers (Irganox 1076 at 750 ppm b.o.m.;

and Irgafos 168 at 1000 ppm b.o.m.) were also added to the monomer mix. A chain transfer agent, n-dodecyl mercaptan, was used at a level of 1% of the amount of monomer. The standard reactor temperature was 95° C. and the standard residence time was 22 minutes.

Cladding tubes of polytetrfluoroethylene-co-hexafluorpropylene ("FEP") sheathed with polyethylene which were between 2.1 and 2.3 meters long and having an inside diameter of 7 millimeters were filled under pressure with the polymer after devolatilization. Swagelock fittings were used to seal the cladding tube ends. Water (0.40% b.o.m.) was mixed into the polymer as it was pumped into the cladding tubes. Another pump was used to separately add the dye solutions (to provide a dye concentration in the light pipe core of from 0 to 58 ppb) while the polymer was pumped into the tubes.

The following outlines the details of the standard polymerization: Monomer mixes were prepared as follows: To a 19 liter 316 stainless steel vessel were added and mixed 9500 g of ethyl acrylate, 500 grams of the functionally reactive monomer, 3-methacryloxypropyltrimethoxysilane (MATS) (5 wt. % b.o.m.), 6.4 g. of initiator (recrystallized 2,2'-azobis(2,4-dimethyl valeronitrile) (0.064% ) and 100 g. of n-dodecyl mercaptan (1 wt. %). The mixture was sparged for at least 15 minutes with nitrogen and degassed under 711 mm vacuum as it was pumped into the reactor.

The monomer mix was fed through a 0.045 micron PTFE membrane cartridge filter to a 2000 ml stainless steel constant flow stirred tank reactor (CFSTR). During polymerization, flow rates for the 2000 ml CFSTR were ca. 90 g/min. to produce a 22-minute residence time. The CFSTR was equipped with multiple (6) blade 45° pitch turbine agitators. During polymerization, the reactors were held at 95° C., and agitated at 225 rpm under a pressure of 1035 kPa.

Reactor effluent (copolymer and residual monomer) was fed through a back-pressure valve set nominally at 1035 kPa into a devolatilization column comprising a stainless steel twisted-tape motionless mixer (60 cm. in length with a jacket of about 50 cm length) mounted on an 39-liter stainless steel catchpot. Heating oil recirculated through the column jacket was held at 200° C. at the jacket inlet. The catch-pot was held at 100–110° C. and ca. 300–400 mm. of vacuum during devolatilization. Upon completion of the polymerization, the catch-pot was back-filled with filtered nitrogen. The monomer-to-polymer conversion of the effluent was approximately 82–87%, as measured gravimetrically. Gravimetrically determined solids content of the devolatilized polymer typically was 99.5% wt.

The composition was cured for two weeks at 90° C. during which crosslinking occurred. After curing, the ends of the filled cladding tubes were trimmed to provide light pipes 1.83 meters in length. Five 1.83 meter long light pipe sections were coupled end-to-end to produce a 9.1 meter long light pipe. The color of the light emitted from light pipes of each core composition was visually inspected when illuminated with both a quartz tungsten halogen and metal halide illuminators. The data appear below.

TABLE 3

Examples

| Ex. | Dye | Dye Conc. $10^{-9}$ mol/l | ppb | f | Light Source | Color/Hue |
|---|---|---|---|---|---|---|
| 1 | — | — | — | — | halogen | green |
| 2 | — | — | — | — | metal halide | green |
| 3 | Solvent Violet 14 | 5.4 | 2 ppb | 20% | halogen | slight green |
| 4 | Solvent Violet 14 | 5.4 | 2 ppb | 20% | metal halide | slight green |
| 5 | Solvent Violet 14 | 10.7 | 4 ppb | 41% | halogen | slight red |
| 6 | Solvent Violet 14 | 10.7 | 4 ppb | 41% | metal halide | no color |
| 7 | Solvent Violet 14 | 16.1 | 6 ppb | 61% | halogen | red |
| 8 | Solvent Violet 14 | 16.1 | 6 ppb | 61% | metal halide | slight red |
| 9[†] | Solvent Violet 14 | 155 | 58 ppb | 590% | metal halide | red |
| 10 | Solvent Red 52 | 6.1 | 2 ppb | 16% | halogen | slight green |
| 11 | Solvent Red 52 | 6.1 | 2 ppb | 16% | metal halide | no color |
| 12 | Solvent Red 52 | 12.2 | 4 ppb | 32% | halogen | slight red |
| 13 | Solvent Red 52 | 12.2 | 4 ppb | 32% | metal halide | slight red |
| 14 | Solvent Red 52 | 18.3 | 6 ppb | 47% | halogen | red |
| 15 | Solvent Red 52 | 18.3 | 6 ppb | 47% | metal halide | red |
| 16 | Solvent Red 111 | 9.4 | 2 ppb | 15% | halogen | slight orange |
| 17 | Solvent Red 111 | 9.4 | 2 ppb | 15% | metal halide | no color |
| 18 | Solvent Red 111 | 18.9 | 4 ppb | 30% | halogen | slight orange |
| 19 | Solvent Red 111 | 18.9 | 4 ppb | 30% | metal halide | slight orange |
| 20 | Solvent Red 111 | 28.3 | 6 ppb | 44% | halogen | slight orange |
| 21 | Solvent Red 111 | 28.3 | 6 ppb | 44% | metal halide | slight orange |

† - Light pipe length was 1.83 meters

The data appearing in Table 3 show the effectiveness of adding between f=15% and f=590% of an Anthraquinone family dye to a light pipe core of linked polyethylacrylate to control the color of the light passing through.

What is claimed is:

1. A light pipe for receiving light from a light source, the light pipe having a core comprising
    (a) one or more polymeric materials having a first light absorbance at peak maximum; and
    (b) one or more non-fluorescing dyes having a second light absorbance at peak maximum and which does not reemit light visible to the naked human eye,
wherein the first and second light absorbance at peak maximums are chosen to control the color of the light passing therethrough.

2. The light pipe according to claim 1 wherein the one or more polymeric materials has a light absorbance at peak maximum at a wavelength between 600 and 650 nm.

3. The light pipe according to claim 1 wherein the one or more dyes has a light absorbance at peak maximum at a wavelength between 500 and 580 nm.

4. The light pipe according to claim 1 wherein the one or more dyes has a concentration sufficient to provide a light absorbance at peak maximum that is from 5% to 100% of the light absorbance at peak maximum of the one or more polymeric materials, wherein
    (a) the one or more dyes has a light absorbance at peak maximum at a wavelength between 500 and 580 nm, and
    (b) the one or more polymeric materials has a light absorbance at peak maximum at a wavelength between 600 and 650 nm.

5. The light pipe according to claim 1 wherein the one or more polymeric materials has at least ten carbon-hydrogen bonds per 1000 atomic mass units.

6. The light pipe according to claim 1 wherein the one or more dyes belongs to the anthraquinone, perinone, or xanthene families of dyes.

7. The light pipe according to claim 6 wherein the one or more dyes has a concentration sufficient to provide a light absorbance at peak maximum that is from 1% to 1000% of the light absorbance at peak maximum of the one or more polymeric materials.

8. A light pipe according to claim 1 wherein the one or mored dyes has a concentration sufficient to provide a light absorbance at peak maximum that is from 1% to 1000% of the light absorbance at peak maximum of the one or more polymeric materials.

* * * * *